ically designed that the count in the reference time frame as established by the reference oscillator corresponds generally to that of the loop oscillator. Then, upon the occurrence of a vehicle over the loop, the resulting change in the inductance of the loop causes the count within the reference time frame to change, and this change is sensed to provide a vehicle detection indication.

United States Patent [19]
Potter

[11] 3,873,964
[45] Mar. 25, 1975

[54] VEHICLE DETECTION

[75] Inventor: Thomas R. Potter, Los Alamitos, Calif.

[73] Assignee: Indicator Controls Corp., Gardena, Calif.

[22] Filed: Feb. 19, 1974

[21] Appl. No.: 443,299

[52] U.S. Cl. .................. 340/38 L, 328/42, 328/44, 340/332
[51] Int. Cl. ............................................. G08g 1/01
[58] Field of Search ....... 200/86 R, 86 A; 340/38 R, 340/38 L, 258 C, 272

[56] References Cited
UNITED STATES PATENTS
3,820,100  6/1974  Ballinger et al. ................. 340/258 C Primary Examiner—Thomas B. Habecker
Assistant Examiner—James Groody
Attorney, Agent, or Firm—Jessup & Beecher

[57] ABSTRACT

A digital vehicle detection system is provided which responds to changes in the inductance of a wire loop embedded in the roadway to sense the presence of a vehicle. The loop and associated lead-in connections are used as the frequency-determining network of a Class-C oscillator, and digital circuitry is used to measure the frequency of the oscillator. An automatic tuning circuit is included which generates a reference time frame for the frequency measurement, and vehicle detection is sensed when the cycle count in the reference time frame changes in excess of a particular threshold, from one reference time frame to the next. To compensate for drift which causes the resonant frequency of the loop lead-in network to increase, a low rate signal is generated which serves to impart to the system a tendency to decrease the reference frame time, from one frame time to the next.

20 Claims, 4 Drawing Figures

VEHICLE DETECTION

The system to be described is of the same general type as disclosed and claimed in copending application Ser. No. 364,492, which was filed May 29, 1973 in the name of the present inventor, and which is assigned to the present assignees.

BACKGROUND OF THE INVENTION

As described in the copending application, sub-surface magnetic inductance vehicle detection systems are known to the prior art. Such systems employ inductive wire loops mounted beneath the surface of the roadway, which exhibit inductance changes as a vehicle crosses into the area circumscribed in the loop. Such prior art vehicle detection systems also include an electronic detector circuit which senses changes in the inductance in the loop to detect the presence of a vehicle.

As also explained in the copending application, the amount of inductance decrease in the loop is dependent on the size and the shape of the vehicle crossing into the loop, as well as upon the metallic content of the vehicle. The system of the present invention, like the system of the copending application, responds to changes in frequency of an oscillator whose frequency-determining circuit is formed by the loop and lead-in connection, to detect the presence of a vehicle within the confines of the loop.

The system of the present invention, like the system of the copending application, exhibits superior sensitivity and hold time characteristics, as compared with the prior art systems, and the system of the invention is capable of sensing and holding extremely small changes in the inductance loop, such as are created by bicycles, motorcycles, small cars, and the like.

The vehicle detection system to be described is based completely on digital principles, and it provides high sensitivity with high stability and excellent hold time, both characteristics being required for detecting and responding to the presence of small vehicles within the loop.

The system of the present invention is based on the measurement of the loop and lead-in resonant frequency, and this results in the virtual elimination of the dependence of the system on the quality factor (Q) of the loop in order to attain high sensitivity. The loop and lead-in network are used in the embodiment to be described as the frequency-determining circuit of a Class-C loop oscillator. The loop oscillator treats the frequency-determining circuit as a two-terminal network, and this obviates the prior art requirement that either the inductive or capacitive portion of the frequency-determining circuit be tapped in order to provide the necessary feedback so as to sustain oscillation in the loop oscillator.

The loop oscillator in the system of the invention is caused to continually oscillate at the resonant frequency during normal operation of the system, and digital circuitry in the system measures the frequency of the loop oscillator by a cycle-counting technique. The system includes an automatic timing circuit which generates a reference frame time for the frequency counting measurement. The reference frame time is a function of the desired operational sensitivity of the system, and of the resonant frequency of the loop and lead-in loop oscillator frequency-determining circuit. Vehicle detection occurs whenever an increase of loop oscillator frequency counts occurs from one reference frame time to the next, and when that increase exceeds a predetermined threshold.

The system of the invention may be set to a "pulse" mode in which it generates an output pulse of a predetermined width for each vehicle moving into the area circumscribed by the loop. Alternately, it may be set to a "presence" mode in which it produces an output signal which persists, within certain time limits, for as long as the vehicle is within the loop. The system of the invention, in its pulse mode, is well adapted for sensing or counting rapidly moving traffic; and in its presence mode, the system is adapted for controlling traffic lights, for example, for slow moving vehicles under heavy traffic conditions.

DETAILED DESCRIPTION OF THE ILLUSTRATED EMBODIMENT

Figure 1A:
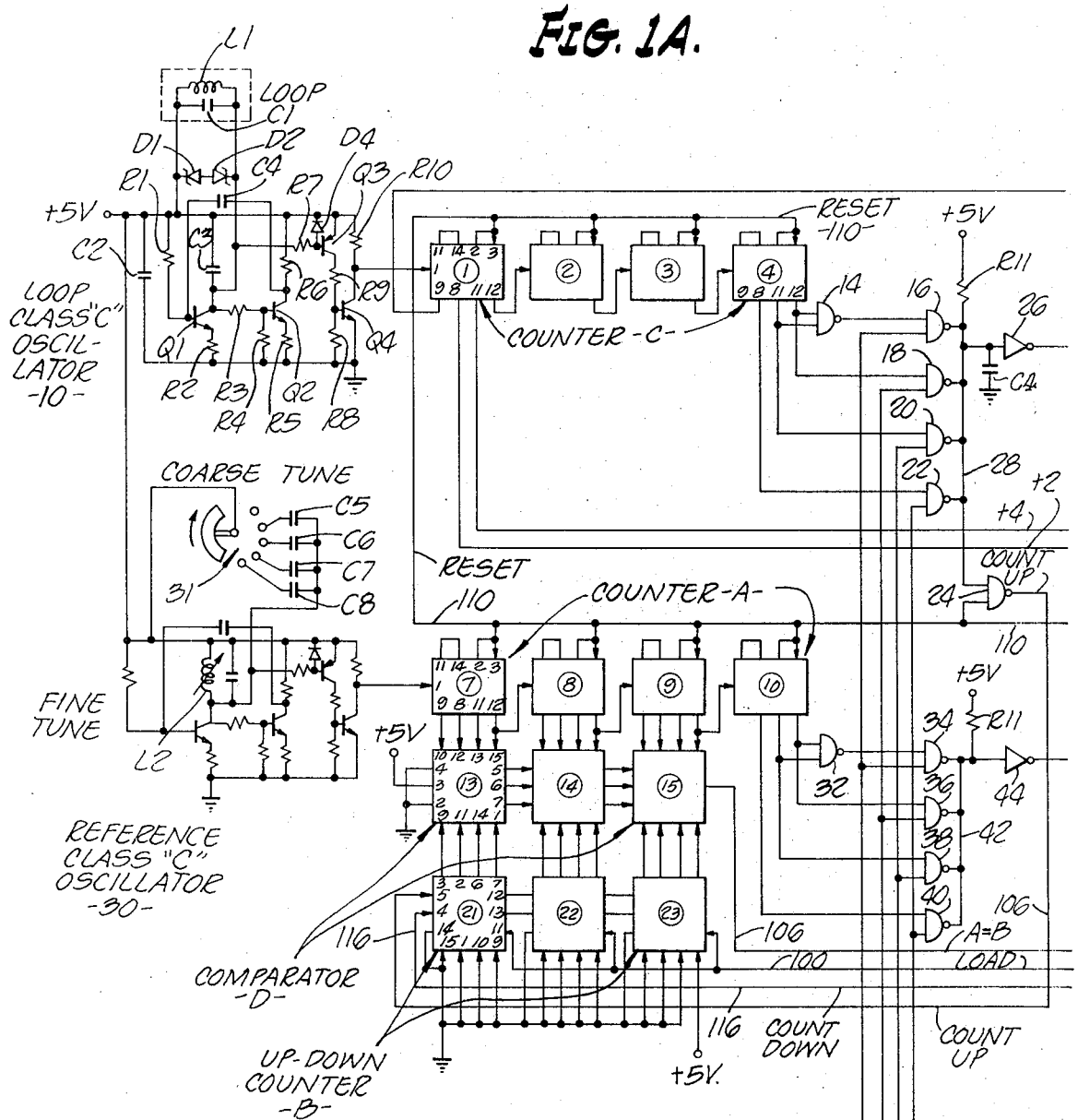
FIGS. 1A and 1B together illustrate a logic block diagram of one embodiment of the system of the invention.
Figure 1B:
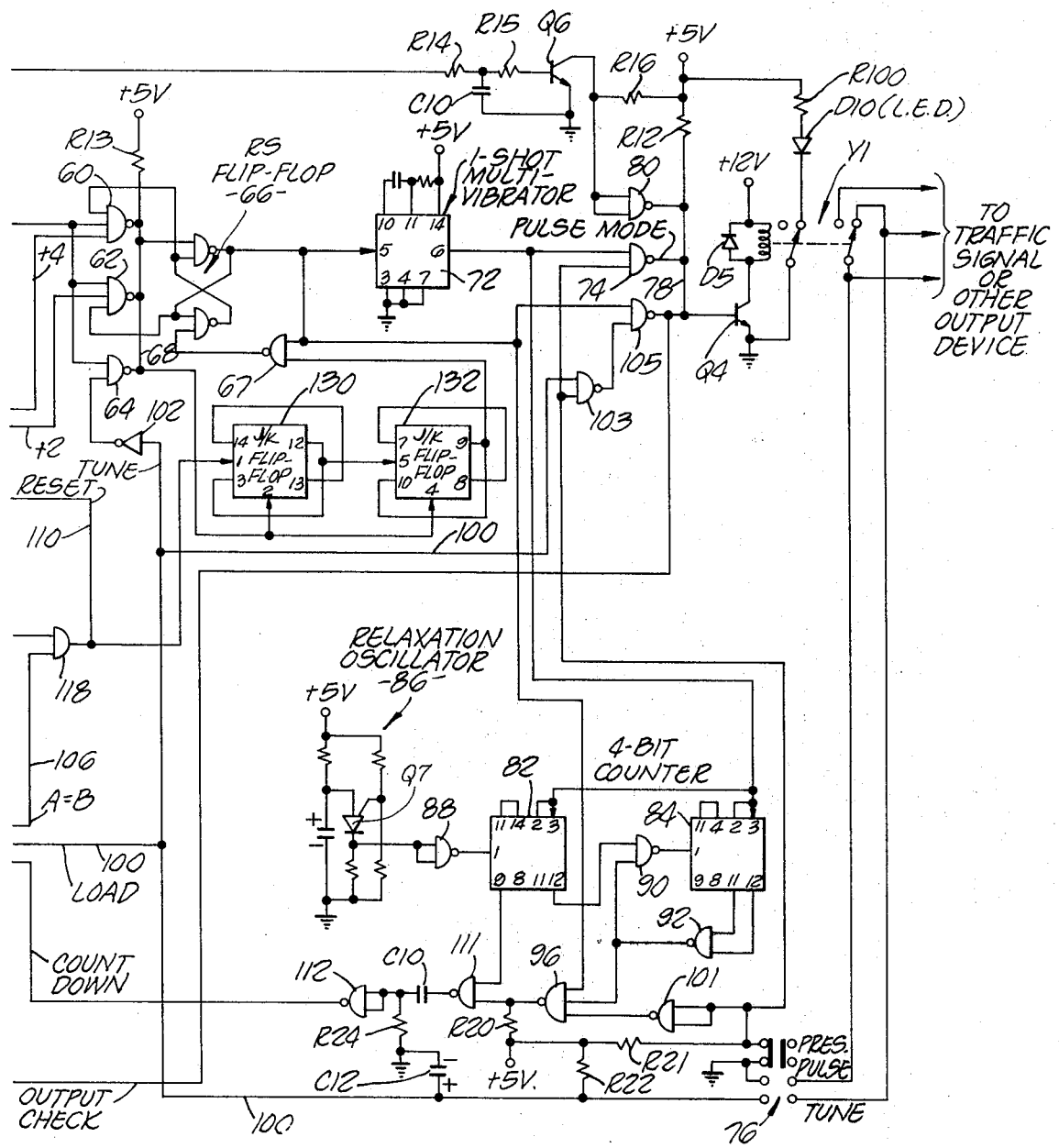

The system of FIGS. 1A and 1B includes a loop oscillator 10 which, as illustrated, includes a loop inductance coil L1, and lead capacitor C1. The loop is embedded in the roadway. This network, together with a 5600 picofarad capacitor C3, determines the resonant frequency. The loop is connected to the loop oscillator 10 by a pair of leads which, as explained above, form part of the frequency-determining circuit. These leads are shunted by a pair of Zener diodes D1 and D2.

The loop oscillator 10 is made up of a pair of NPN transistors Q1 and Q2. The emitter of the transistors are connected respectively to a pair of grounded resistors R2 and R5. The resistor R2 may have a resistance, for example, of 150 ohms, and the resistor R5 may have a resistance, for example, of 100 ohms. The base of the transistor Q1 is connected through a 27 kilo-ohm resistor R1 to the positive terminal of a 5-volt direct current source. The negative terminal of the source may be grounded, and the source is shunted by a capacitor C2 of 0.22 microfarads.

The collector of the transistor Q1 is connected to one of the loop leads, and the other loop lead is connected to the positive terminal of the direct voltage source. The collector of transistor Q1 is also connected to the capacitor C3 which, in turn, is connected to the positive terminal of the direct voltage source. The collector of the transistor Q1 is further connected through a 22 kilo-ohm resistor R3 to the base of the transistor Q2 and to a 4.7 kilo-ohm grounded resistor R4. The collector of the transistor Q2 is connected through an 820 ohm resistor R6 to the positive terminal of the direct voltage source. The collector of the transistor Q2 is connected to a 0.01 microfarad feedback capacitor C4 which is connected to the base of the transistor Q1.

The transistors Q1 and Q2 are connected as a Class-C oscillator, and the frequency of the oscillator is established by the circuitry associated with the loop and the leads which connect the loop to the oscillator. The output of the oscillator appears at the collector of the transistor Q1, and this output is introduced to the base of a PNP transistor Q3 through a 4.7 kilo-ohm resistor R7. The transistor Q3, and a further transistor Q4 are connected as a squaring and amplifier circuit, so that triggering pulses appear at the collector of the transistor Q4 to drive a binary counter C.

The emitter of the transistor Q3 is connected to the positive terminal of the 5-volt source, and the collector is connected through a 10 kilo-ohm resistor R9 to the base of the transistor Q4. The emitter of the transistor Q4 is grounded, and its base is also connected to a grounded 10 kilo-ohm resistor R8. The collector of the transistor Q4 is connected to the input of the counter C, and also through a 1 kilo-ohm resistor R10 to the positive terminal of the 5-volt source.

As explained above, the loop oscillator 10 is a Class-C oscillator whose frequency-determining circuit is formed by the loop inductance L1 and the lead capacitance C1, together with the capacitor C3, all of which are treated as a two-terminal frequency-determining circuit. The loop oscillator generates a sine wave which causes the squaring amplifier to generate a square wave which, in turn, drives the binary counter C.

Outputs from the binary counter C are introduced to NAND gates 14, 18, 20 and 22; the output of NAND gate 14 is applied to a NAND gate 16; and the outputs of the NAND gates 16, 18, 20 and 22 are wire OR'D and applied to a NAND gate 24 and to an inverter 26 by way of a common lead 28. The lead 28 is connected to a grounded 1,000 picofarad capacitor C4 and through a 4.7 kilo-ohm resistor R11 to the positive terminal of a 5-volt direct current source. The capacitor C4 acts as a delay means to assure that the reset pulse will not be seen at the beginning of a frame time.

The circuit of FIGS. 1A and 1B also includes a Class-C reference oscillator 30 whose circuitry may be identical to that of the loop oscillator 10, except that its frequency-determining circuit is formed by an inductance coil L2, whose inductance is variable between 54–125 microhenries for fine tuning purposes. The inductance coil L2 is shunted by a plurality of capacitors C5, C6 C7 and C8 having respective capacities of 4,700 picofarads, 0.01 microfarads, 0.022 microfarads and 0.033 microfarads. The capacitors are selectively switched into circuit with the inductance coil L2 by a switch 31 for coarse tuning purposes. The reference oscillator frequency is tuned, by adjusting the switch 31, and by adjusting the inductance of the inductance coil L2 to achieve the required reference frame time in the absence of a vehicle within its loop L1.

The reference oscillator 30 drives a binary counter A which is similar to the binary counter C referred to above. The outputs of the binary counter A are introduced to NAND gates 32, 34, 36, 38 and 40. The outputs of the NAND gates 34, 36, 38 and 40 are wire OR'D and applied to a common lead 42 which is connected to an inverter 44, and through a 4.7 kilo-ohm resistor R11 to the positive terminal of the 5-volt direct current source.

A sensitivity switch 50 is connected through inverters 52, 54, 56 and 58 to corresponding ones of the NAND gates 16, 18, 20, 22 and 34, 36, 38, 40, as shown. When the switch 50 is in its "Hi" position, the gates 16 and 34 are enabled; when the switch is in its "Med" position, the gates 18 and 36 are enabled; when the switch is in its "Lo 1" position, the gates 20 and 38 are enabled; and when the switch is in its "Lo 2" position, the gates 22 and 40 are enabled.

The reference oscillator 30 and counter A generate the reference frame time for the system which is a function of the desired operating detection sensitivity and of the resonant frequency of the loop oscillator. Detection sensitivity is established by the setting of the switch 50 which, in turn, determines the total count for each reference frame time. For example, when the switch 50 is set to "Hi," the total count for the reference frame time may be 50,000 cycles. When a vehicle is detected, a minimum 4-cycle increase occurs from one reference frame time to the next which, in the case of the "Hi" setting represents a 0.008% resonant frequency increase. Adjustment of the switch 50 to its "Med" position, for example, reduces the total count for the reference frame time to 33,000 cycles; adjustment of the switch to the "Lo 1" position reduces the total count for the reference frame time to 16,000 cycles; adjustment of the switch 50 to the "Lo 2" setting reduces the total count for each reference frame time to 8,000 cycles; so that sensitivity may be selectively decreased for each setting of the switch 50.

The output of the inverter 26 is applied to three NAND gates 60, 62 and 64 which, in turn, are connected to the set input of an RS flip-flop 66 by way of a common lead 68. The lead 68 is connected to the positive terminal of the 5-volt source through a 2.2 kilo-ohm resistor R13. The NAND gate 60 is enabled when the RS flip-flop is reset, and the NAND gate 62 is enabled when the RS flip-flop is set. The NAND gate 60 causes the RS flip-flop 66 to be set when the count of the counter C selected by the switch 50 is exceeded by four, and the gate 62 causes the RS flip-flop 66 to be held in its set position so long as the selected count is exceeded by two. These connections provide a system hysteresis in the detector, which prevents toggling when a vehicle is just at the threshold point. A four-cycle increase above the selected count is required to initiate a vehicle detection system, but only a two-cycle increase above the selected count is required to hold the detection signal.

The set output of the RS flip-flop 66 is applied to a NAND gate 67 which is connected back to the reset input terminal of the flip-flop 66. The set output of the flip-flop 66 is also applied to a one-shot multivibrator 72 whose output is introduced to a NAND gate 74. The NAND gate 74 is enabled during the pulse mode of the system by the appropriate setting of a switch 76. The output of the NAND gate 74 is applied to a common lead 78 which is connected through a 2.2 kilo-ohm resistor R12 to the positive terminal of the 5-volt source.

The lead 78 is also connected to the base of a grounded emitter NPN transistor Q4, the collector of which is connected through the energizing coil of a relay Y1 to the positive terminal of a 12-volt direct current source. The energizing coil of the relay is shunted by a diode D5 which may be of the type presently designated IN4001. The relay Y1 is normally energized. When the relay Y1 is de-energized it closes traffic signal circuit, or other output device.

To set the system of FIGS. 1A and 1B initially, the switch 76 is moved to a "load" or "tune" position at which it grounds a "load" lead 100, and also bridges the normally open contacts of the relay Y1 to provide a continuous output signal to the traffic controller. The lead 100 is connected through an inverter 102 to the NAND gate 64; and it is also connected to the selected input terminals of an up/down counter B forcing the counter to a predetermined mid-range count during the initial adjustment of the system.

A comparator D is interposed between the counter A and the up/down counter B. The comparator develops a pulse on the lead 106 whenever the count in the counter A coincides with the count in the counter B. The lead 106 is connected to an AND gate 118, together with the output of the inverter 44. The AND gate 118 is connected to a reset lead 110 which is connected back to the counters B and A to cause the counters to be reset whenever the AND gate 118 develops an output. The reset lead 110 is also connected to the AND gate 24, and the NAND gate 24 introduces a "count up" command to the counter B whenever the NAND gate 24 develops an output.

The least significant bit terminal of the counter C is connected through a pair of 2.2 kilo-ohm resistors R14 and R15 to the base of an NPN transistor Q6. The common junction of the resistors R14 and R15 is connected to a grounded 0.0222 microfarad capacitor C10. The transistor Q6 is connected as a grounded emitter transistor. Its collector is connected through a 4.7 kilo-ohm resistor R16 to the positive terminal of the 5-volt source, and through an inverter 80 to the common lead 78.

A pair of integrated circuits 82 and 84 are connected as 4-bit counters which count pulses from a relaxation oscillator 86. The relaxation oscillator includes a unijunction transistor Q7 which may be of the type designated P13T1, and which is connected in the illustrated manner. The output of the oscillator is passed through a buffer 88 to pin 1 of the integrated circuit 82. Pin 12 of the integrated circuit 82 is connected to a NAND gate 90 whose output is connected to pin 1 of the integrated circuit 84. Pins 11 and 12 of the integrated circuit 84 are connected to a NAND gate 92, whose output is connected to the NAND gate 90 and to a further NAND gate 96. Pins 2 and 3 of each of the integrated circuits 82 and 84 are connected to the output of the one-shot multivibrator 72, so that the counter may be reset to zero upon the detection of a vehicle in the detecting loop of the system.

An inverter 101 is connected to the "presence" terminals of mode selecting switch 76, as are the NAND gate 74 and a further NAND gate 103. The output of the NAND gate 103 is connected to a further NAND gate 105 which, in turn, is connected to the common lead 78, and back to the switch 50 for output checking purposes. The inverter 80, NAND gate 74, NAND gate 105, and "output check" lead from switch 50 are wire OR'D and connected to the base of transistor Q4. The set output of the RS flip-flop 66 is connected to the NAND gate 105 and to the NAND gate 96, as well as to the NAND gate 67.

The NAND gate 96 is connected through a 4.7 kilo-ohm resistor R20 to the positive terminal of the 5-volt source, and the "presence" and "tune" terminals of the mode selecting switch 76 are connected to the positive terminal through respective resistors R21 and R22, the resistor R21 having a value of 4.7 kilo-ohms, and the resistor R22 having a value of 680 ohms.

The output of the NAND gate 96 is also connected to a NAND gate 111, as is pin 9 of the integrated circuit 82. The output of the NAND gate 111 is connected to a 2,200 picofarad capacitor C10 which, in turn, is connected to a 470 ohm grounded resistor R24. The load lead 100 is connected to a grounded capacitor C12. The capacitor C10 is also connected to an inverter 112 which introduces the count down command to the up-down counter B over the lead 116.

A pair of J/K flip-flops 130 and 132 are included in the circuit. The NAND gate 64 is connected to the flip-flops 130 and 132 to reset the flip-flops whenever a car is detected. The AND gate 118 is connected to the clock input of the flip-flop 130 to toggle the flip-flop whenever an output is developed by the AND gate 118. When the flip-flop 130 is toggled twice, it sets the flip-flop 132. The flip-flops 130 and 132 serve to reset the RS flip-flop 66 in the event that two clock pulses are produced by the AND gate 118, without a reset pulse being produced by the NAND gate 64.

A second normally open relay contact of the relay Y1 is connected through a light-emitting diode D10 and through a 270 ohm resistor R100 to the positive terminal of the 5-volt source.

In the operation of the system of FIGS. 1A and 1B, the switch 76 is first placed to the "load" or "tune" position, to place a ground on the lead 100. This sets and locks the up-down counter B at its 0000,0000,0001 position, due to the connections of its lower terminals. This count is also reflected at the upper terminals of the up-down counter which are connected to the comparator D.

The switch 50 is set to the desired sensitivity position, and when the count of the loop oscillator C reaches the count corresponding to the setting of the sensitivity switch 50, an output appears on the lead 28 which is introduced through the inverter 26 to the NAND gate 60. Then, if that count is exceeded by four more counts before the counter C is reset, the enabled NAND gate 60 becomes conductive to set the RS flip-flop 66. The setting of the RS flip-flop 66 triggers the one-shot multivibrator 72, and its output pulse is passed by the NAND gate 74 when the switch 76 is in its "pulse" position. This renders the transistor Q4 non-conductive so as to de-energize the relay Y1. When the relay Y1 is de-energized, the light-emitting diode D10 is activated. During the load, or tuning, mode, the lower contacts of the switch 76 bridge the normally-open contacts of the relay which are connected to the traffic signal, so that the traffic signal will service that detection zone. The NAND gate 62 is now enabled, and if the counter drops two or more counts the flip-flop is reset. This creates the "hysteresis" action referred to above.

During the "tune" mode, the switch 31 and inductance coil L1 are adjusted to set the frequency of the reference oscillator 30 which, in turn, controls the reference frame time at which the loop oscillator is reset. The frequency of the reference oscillator is first decreased until the count of counter A in each reference frame time (at the particular sensitivity setting of switch 50) just exceeds the set count of the loop counter C. When that occurs, the output of the NAND gate 64 sets the RS flip-flop 66 and de-energizes the relay Y1 causing the LED D10 to illuminate. The frequency of the reference oscillator is now increased slightly so that the counters are reset just before the set count occurs, and the LED D10 remains extinguished.

The system is now in tune, and the mode switch 76 may be moved to either the "pulse" or the "presence" position. The up-down counter B is now freed, and will respond to "count up" and "count down" commands.

The presence of a vehicle in the loop of the system causes the frequency of the loop oscillator 10 to increase, so that additional counts are counted by the loop counter C before the end of the time frame established by the reference counter A is reached at which both counters A and C are reset. Thus the counters are reset in each time frame after the set count plus four, and NAND gate 60 is rendered conductive to set the RS flip-flop 66 and indicate the detection of a vehicle. Each time the RS flip-flop 66 is set during the "pulse" mode, indicating the detection of a vehicle, the one-shot multivibrator 72 is actuated to cause a pulse to be passed by the NAND gate 74 to the transistor Q4 to operate the relay Y1 for the duration of the pulse generated by the one-shot multivibrator. The hysteresis action described above, requires the loop counter to decrease below the set plus two count level before the flip-flop 66 is reset, as established by the NAND gate 62.

Should the frequency of the loop oscillator 10 decrease, a drift condition is indicated, since vehicle detection causes the frequency of the loop oscillator to increase. When such a decrease occurs, the NAND gate 24 produces pulses, indicating that the loop counter C is being reset before it reaches its set count. These pulses are applied to the up-down counter B, to cause the up-down counter to increase its count until equilibrium is again established. It is to be noted that drift conditions are compensated by the simple expedient of controlling the count of the up-down counter B, and no attempt is made to control the frequencies of the oscillators themselves.

During the pulse mode, the NAND gate 111 is enabled, through NAND gate 96 and inverter 101 so that pulses from the relaxation oscillator 86 which appear at the pin 9 of the integrated circuit 82 are passed through capacitor C10 and buffer inverter 112 to the count-down lead 116. These pulses appear, for example, with a repetition rate of the order of one per second, and continually tend to cause the up-down counter B to be slowly counted down.

Therefore, should the frequency of the oscillator tend to drift in the increased frequency direction, the drift is continually compensated by the pulses on the lead 116, which continually causes the up-down counter B to count down. Whenever the count of the counter B is reduced below the established time frame interval, the count up pulses appear at the output of the NAND gate 24 at a much faster rate, so that the up-down counter B is held at the appropriate count to establish the desired reference time frame interval for the loop oscillator 10, in the presence of oscillator drift in either direction.

It is to be noted that any tendency for the loop oscillator to drift in the increased frequency direction cannot produce false triggering of the system. This is because of the up-down counter is continually counted down by the pulses on lead 116 to cause the comparator D to generate a reset pulse for both counters A and C in each time frame before the set count plus four of the loop counter is reached.

To set the system in its "presence" mode, the switch 76 is moved to its upper position at which a ground is placed on the resistor R21 and on the input of the inverter 101 to enable the NAND gate 96. During the "presence" mode setting of the switch 76, the NAND gate 74 is disabled and the NAND gate 105 is enabled. Therefore, for each detection of a vehicle, the RS flip-flop 66 is set, and its resulting set output is passed through the NAND gate 105 to render the transistor Q4 non-conductive, so that the relay Y1 is now de-energized for as long as the RS flip-flop 66 remains in its set condition.

The setting of the RS flip-flop 66 also completes the enabling of the NAND gate 96. However, the pulses on the count-down lead 116 are delayed for a three minute interval to prevent the down count tracking during the time in which a vehicle in the loop is detected. This three minute interval is established by the counter 82, 84 which responds to the pulses from the relaxation oscillator 86, and, in three minutes develops outputs at pins 11 and 12 of the integrated circuit 84 to render the NAND gate 92 to logical "zero." This causes the NAND gate 96 output to be a logical "one" which, in turn, enables the NAND gate 111, so that it again passes one pulse per second from the relaxation oscillator 86 to the count-down lead 116 for tracking purposes. At the same time the output of NAND gate 92 causes a logical "one" to appear at the output of NAND gate 96. The output of NAND gate 92 disables NAND gate 90, therefore disabling counter 84 until the next vehicle is detected. The 4-bit counters 82 and 84 are reset each time the multivibrator 72 develops an output pulse indicating the detection of a new vehicle.

So long as a vehicle is in the sensing loop L1, the resulting pulses developed on the common lead 68 continually reset the J/K flip-flops 130 and 132, so that the RS flip-flop 66 remains in its set condition, and the relay Y1 remains de-energized. However, when the vehicle leaves the sensing loop L1, no further reset pulses are applied to the J/K flip-flops 130, 132, and the output pulses from the AND gate 118 cause the J/K flip-flops 130, 132 to undergo two counts for two successive reset pulses, and at the second count, the NAND gate 67 becomes conductive and the RS flip-flop 66 is reset, so that the relay Y1 is energized, and the system is in readiness to detect the next vehicle.

The circuit of the transistor Q6 is connected to the least significant bit of the counter C, as mentioned above. The resistor R14 and the capacitor C10 from an integrating circuit, so that so long as the loop oscillator 10 is oscillating, the transistor Q6 is conductive so that the input to the inverter 80 is low. However, should the loop oscillator 10 stop oscillating for any reason, the transistor Q6 becomes non-conductive after a time interval determined by the time constant of the integrator, and serves to de-energize the relay Y1 and to hold it de-energized to indicate a malfunction to the traffic signal, or other output device.

Figure 2A:
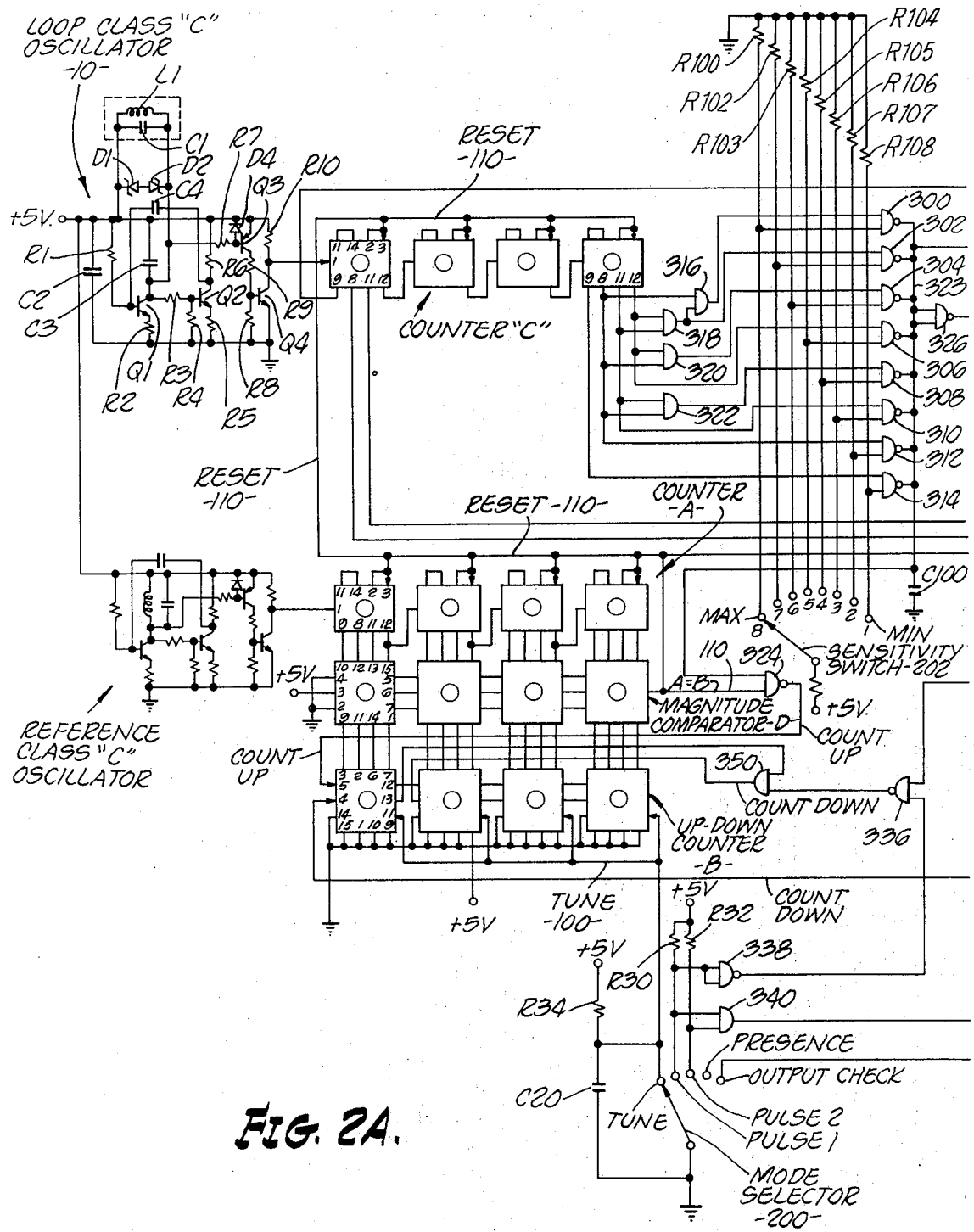
FIGS. 2A and 2B together present a logic block diagram of the system in a modified form.
Figure 2B:
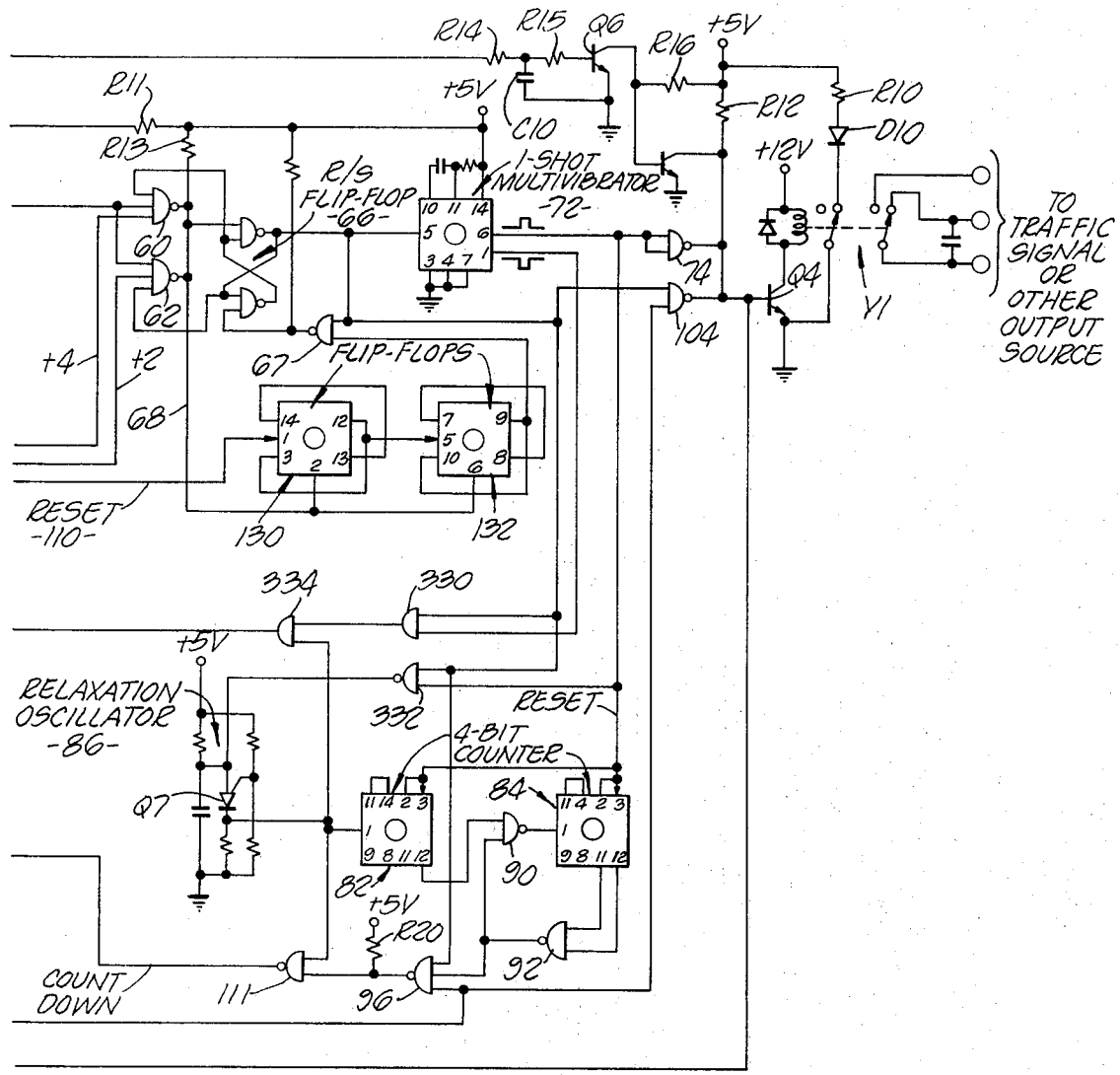

The system of FIGS. 2A and 2B is generally similar to the circuit of FIGS. 1A and 1B, and like components have been designated by the same numbers. In the system of FIGS. 2A and 2B, the initial tuning of the system is accomplished automatically, rather than manually, as is the case with the system of FIGS. 1A and 1B. In the system of FIGS. 2A and 2B, the up-down counter B is extended to a 16-bit counter, and an additional stage in magnitude comparator D is used to compare the counts in the reference counter A and in the up-down counter B.

The mode selector switch 200 has five positions corresponding respectively to "tune," "pulse 1," "pulse 2," "presence" and "output check." These modes correspond to the modes of the previous embodiment, except that in the embodiment of FIG. 2 two pulse modes are provided, one with a high re-tune rate (pulse 1), and one with a low re-tune rate (pulse 2).

The sensitivity switch 202 has eight terminals, numbering from 1 to 8, and extending from minimum to maximum sensitivity. Each of the terminals is connected to a different grounded 270 ohm resistor R100, R102, R103, R104, R105, R106, R107 and R108, and each is connected to a different NAND gate 302, 304, 306, 308, 310, 312 and 314. The pins 8, 9, 11 and 12 of the right-hand integrated circuit in the counter C are connected to respective AND gates 316, 318, 320 and 322 and to the various NAND gates 302, 304, 306, 308, 310, 314 in the illustrated manner.

The outputs of the NAND gates are wire OR'D and connected to a common lead 323 which is connected to a grounded 1000 picofarad capacitor C100 and to a NAND gate 324. The output of the magnitude comparator D is also connected by the lead 110 to the NAND gate 324, and a pulse appears on the lead 110 when A=B. The lead 110 is also the reset lead for the counters A and C, and it also supplies pulses to the J/K flip-flop 130. The lead 323 is also connected through an inverter 326 to the NAND gate 60. The pins 8 and 11 of the left-hand integrated circuit of the counter C are also connected to the NAND gates 62 and 60, as in the previous embodiment to provide the desired hysteresis action.

A second output from the one-shot multivibrator 72 is connected to an AND gate 330, and the set output of the RS flip-flop 66 is also connected to the AND gate 330 and to a NAND gate 332. The NAND gate 332 is connected to the anode of the unijunction transistor Q7 in the relaxation oscillator 86. The AND gate 330 is connected to a second AND gate 334, which is connected to a NAND gate 336. The output of the relaxation oscillator 86 is also connected to the AND gate 334.

The No. 2 terminal (pulse 1) of the mode selector switch 200 is connected to a 4.7 kilo-ohm resistor R30 and to an inverter 338. The resistor R30 is connected to the positive terminal of the 5-volt source. The output of the inverter 338 is connected to the NAND gate 336. The No. 2 terminal (pulse 1) and the No. 3 terminal (pulse 2) of the mode selector switch 200 are connected to an AND gate 340, whose output is connected back to the NAND gate 96 and the NAND gate 104. The No. 3 terminal of the mode selector switch is connected to a 4.7 kilo-ohm resistor R32 which, in turn, is connected to the positive terminal of the 5-volt source. The No. 1 terminal of the mode selector switch (tune) is connected to a grounded 30 microfarad capacitor C20 and to a 680 ohm resistor R34. The resistor R34 is connected to the positive terminal of the 5-volt source. The junction of the capacitor C20 and resistor R34 and the No. 1 terminal of the mode selector switch are connected to the "tune" lead 100 which, in turn, is connected to the up-down counter B. The NAND gate 336 is connected through an AND gate 350 to pin 4 of the second integrated circuit from the left in the up-down counter B. The pin 13 of the preceding integrated circuit is also connected to the AND gate 350.

In the system of FIGS. 2A and 2B, when the mode selector switch 200 is turned to the "tune" position, the system automatically tunes itself to a setting corresponding to the sensitivity selected by the switch 202. When the power is first turned on the reference oscillator oscillates at the reference frequency. The capacitor C20 charges and pulses the lead 100 initially to set the up-down counter B to a relatively low setting of 000,001,000,000.

When the count of the reference counter A reaches the count of the up-down counter B, a pulse is produced on lead 110 which resets both counters A and C. If the particular time frame is such that no output appears on the lead 323 at the count set by the sensitivity switch 202, the NAND gate 324 passes the pulse from the lead 110 to cause the up-down counter to count up one count. This action continues from time frame to time frame until the count of the up-down counter is such that a pulse appears on lead 323 for each time frame. The system is now in tune.

The mode selector switch may now be set to the "pulse 1" position. Now when a vehicle is detected, the loop counter C exceeds the set count +4 count and the R/S flip-flop 66 is set and the one-shot multivibrator 72 generates a pulse to operate the relay Y1 for the duration of the pulse, as in the previous embodiment.

When the mode selector switch 20 is in its "pulse 1" position, the NAND gate 336 is enabled, and the negative-going pulse from the one-shot multivibrator (which is generated when a vehicle remains in the loop zone for one or more seconds) is applied to the intermediate stage of the up-down counter B to cause the counter to count down several counts and shorten the reference time frame at a high rate therefore causing the flip-flop 66 to reset in a very short time even though the vehicle has not left the loop. The system then quickly starts to re-tune itself by generating count up pulses at the output of the NAND gate 324.

Each time a vehicle is detected, causing the flip-flop 66 to set, the NAND gate 332 is enabled, and the corresponding positive-going pulse from the one-shot multivibrator 72 is passed to the anode of the unijunction transistor Q7 in the relaxation oscillator 86. This action immediately stops the oscillator, and it begins a new cycle synchronized by the pulse, that is, with the detection of the vehicle, giving the vehicle one second, for example, to leave the loop before the re-tuning process begins.

When the mode selector switch 20 is in its "pulse 2" position, the NAND gate 336 is disabled, and the re-tuning of the system after a vehicle has been detected proceeds at a slower rate.

During the "pulse 2" mode, the oscillator 86 applies its low frequency drift-compensating pulses to the lower stage of the up-down counter through the NAND gate 111, as in the previous embodiment.

When the mode selection switch is set to its "presence" position, the NAND gate 96 is disabled, which in turn enables gate 111 whenever either RS flip-flop 66 is in the reset condition, or counters 82 and 84 have timed out. Whenever either one of the previous conditions exists, count down pulses are applied to the up-down counter B as in the previous embodiment.

When the system is in the presence mode the NAND gate 104 is enabled so that the relay Y1 is de-energized so long as the flip-flop 66 is set. The flip-flop 66 remains set until the vehicle leaves the loop, and then until the counter of the flip-flop 130, 132 reaches two consecutive counts, as in the previous embodiment.

The invention provides, therefore, an improved digital system, which adjusts automatically to any loop configuration, for sensing the presence of a vehicle in an inductive loop. The system uses digital counter means for measuring changes in the loop resonant frequency.

This provides a highly sensitive detection means which is capable of responding to extremely small vehicles, including bicycles.

Although particular embodiments of the invention have been shown and described, modifications may be made. It is intended in the claims to cover all the modifications which fall within the true spirit and scope of the invention.

What is claimed:

1. A digital vehicle detection system including: an inductive loop to be placed in position to sense the presence of a vehicle; a first oscillator circuit connected to the signal loop for generating an output having a frequency controlled by the inductance of the loop; first counter means connected to the output of the first oscillator circuit for counting the cycles of the output signal generated by the first oscillator circuit; a second oscillator circuit for generating a reference frequency signal output; counter means coupled to said second oscillator circuit and responsive to said reference frequency output signal for generating a series of variable time frames; reset circuit means coupled to said last-named means to reset said first counter means at the end of each such variable time frame so as to establish a series of time frames for the first counter means; and control circuit means coupled to said first counter means to develop a control signal whenever the count of said first counter means exceeds a particular count during any of said time frames.

2. The vehicle detection system defined in claim 1, in which said control circuit means includes manually operable switching means for setting said particular count to different values depending upon the desired sensitivity of the system.

3. The vehicle detection system defined in claim 1, in which said control circuit means includes a flip-flop and logic circuits for setting the flip-flop when the count of said first counter means exceeds said particular count by a first predetermined number of counts, and for subsequently resetting said flip-flop when the count of said first counter means exceeds said particular number of counts less than said first predetermined number.

4. The vehicle detection system defined in claim 3, in which said control circuit means includes a one-shot multivibrator connected to said flip-flop to be activated each time said flip-flop is set to generate an output pulse.

5. The vehicle detection circuit defined in claim 4, in which said control circuit means includes relay means, and a manually operable switch for selectively connecting said relay means to said multivibrator and to said flip-flop to set the system selectively to a pulse mode and to a presence mode.

6. A digital vehicle detection system including: an inductive loop to be placed in position to sense the presence of a vehicle; a first oscillator circuit connected to the loop for generating an output having a frequency controlled by the inductance of the loop; first counter means connected to the output of the first oscillator circuit for counting the cycles of said output signal generated by the first oscillator circuit; a second oscillator circuit for generating an output signal having a reference frequency; second counter means connected to said second oscillator circuit for counting the cycles of the output signal generated by the second oscillator means; reset circuit means coupled to said second counter means to reset said first and second counter means each time said second counter means reaches a predetermined count so as to establish a series of time frames for the first counter means; and detection circuitry coupled to said first counter means to develop a control effect whenever the count of said first counter means exceeds a particular count during any of said reference frames.

7. The vehicle detection system defined in claim 6, and which includes up-down counter means; comparator means interposed between said second counter means and said up-down counter means for producing an output signal when the counts in said second counter means and said up-down counter means have a predetermined relationship; and reset circuitry coupled to said comparator means for resetting the first and second counter means each time the comparator develops said output signal to control the duration of the successive time frame of the series.

8. The vehicle detection system defined in claim 7, in which said detection circuitry includes pulse generating means for introducing pulses to said up-down counter means to cause said up-down counter means to count down whenever the durations of the successive reference time frames of the series are greater than the time taken by the first counter means to reach a predetermined count.

9. The vehicle detection system defined in claim 8, and which includes further counter means to delay the application of pulses from said pulse generating means to said up-down counter for a predetermined time interval, and manually operable switching means for connecting said further counter means in circuit with said pulse generating means when the system is set to a presence mode of operation.

10. The vehicle detection system defined in claim 7, in which said detection circuitry includes logic circuitry coupled to the first counter means and to said reset circuit means for introducing pulses to said up-down counter means to count up whenever the first counter means fails to reach a particular count during any of said reference time frames.

11. The vehicle detection system defined in claim 7, and which includes a tuning circuit for setting the up-down counter to a predetermined count, and a manually operable switch for selectively connecting said tuning circuit to said up-down counter.

12. The vehicle detection system defined in claim 6, and which includes manually controllable circuitry connected to said second oscillator for controlling the reference frequency of the output signal generated thereby.

13. The vehicle detection system defined in claim 7, in which said detection circuitry includes logic circuitry coupled to the first counter means and to the comparator means for introducing pulses to said up-down counter means to said up-down counter means to count up whenever the first counter means fails to reach a particular count during any of the reference time periods.

14. The vehicle detection system defined in claim 7, and which includes an automatic tuning circuit coupled to said comparator means and to said first counter means for setting said up-down counter means to a count corresponding to a predetermined count of said first counter means for each of the reference time frames.

15. An inductive type of vehicle detection system including: an inductive loop to be placed in position to sense the presence of a metallic vehicle; a first Class-C oscillator connected to the loop and using the loop as a frequency determining element and generating a signal having a frequency corresponding to the frequency of the oscillator; a second Class-C oscillator circuit for generating a signal having a reference frequency; and digital logic circuit means connected to said first and second oscillators and responding to the signals generated thereby for indicating the presence of a vehicle in the inductive loop.

16. The inductive type of vehicle detection system defined in claim 15, and which includes a lead-in network connecting the inductive loop to the first oscillator circuit and cooperating with the loop to form a two-terminal frequency determining network for the first oscillator.

17. The vehicle detection system defined in claim 1, in which the first and second oscillator circuits are Class-C oscillators, and which includes a two-terminal network connecting the inductive loop to the first oscillator circuit.

18. The vehicle detection system defined in claim 8, in which said detection circuitry includes pulse generating means for introducing pulses to said up-down counter means to cause said up-down counter means to count down whenever the duration of the successive reference time frames of the series are greater than the time taken by the first counter means to reach a predetermined count; and control circuitry connected to said pulse generating means and to said up-down counter for selectively setting the rate at which said up-down counter means counts down under such conditions.

19. The vehicle detection system defined in claim 8, and which includes means to delay the application of pulses from said pulse generating means to said up-down counter for a predetermined time interval after the detection of a vehicle.

20. The vehicle detection system defined in claim 8, and which includes a synchronizing circuit connected to said pulse generating means for synchronizing said pulse generating means each time a vehicle is detected by the system.

* * * * *